United States Patent [19]

Kawasaki

[11] E Re. 31,446

[45] Reissued Nov. 22, 1983

[54] MANUAL OR AUTOMATIC CAMERA AND ELECTRONIC FLASH FOR USE THEREWITH

[75] Inventor: Masahiro Kawasaki, Tokyo, Japan

[73] Assignee: Asahi Kogaku Kogyo Kabushiki Kaisha, Japan

[21] Appl. No.: 363,859

[22] Filed: Mar. 31, 1982

Related U.S. Patent Documents

Reissue of:

[64] Patent No.: 4,196,988
Issued: Apr. 8, 1980
Appl. No.: 880,800
Filed: Feb. 24, 1978

[30] Foreign Application Priority Data

Feb. 28, 1977 [JP] Japan ..... 52-20368

[51] Int. Cl.[3] ..... G03B 7/08; G03B 15/05

[52] U.S. Cl. ..... 354/33; 354/34; 354/51; 354/139; 354/145

[58] Field of Search ..... 354/32, 33, 34, 51, 354/60 F, 139, 145, 149

[56] References Cited

U.S. PATENT DOCUMENTS

| | | | |
|---|---|---|---|
| 3,785,259 | 1/1974 | Kitai | 354/34 |
| 4,047,194 | 9/1977 | Nakamura et al. | 354/33 X |
| 4,086,582 | 4/1978 | Kiyohara et al. | 354/33 |

*Primary Examiner*—Michael I. Gellner
*Attorney, Agent, or Firm*—Steinberg & Raskin

[57] ABSTRACT

A camera has an electrical exposure-time determining structure as well as a manually adjustable electrical structure and a light-responsive electrical structure both of which are connected to the exposure-time determining structure by way of a selecting circuit which can be set to operate the exposure-time determining structure either by way of the manually adjustable electrical structure or by way of the light-responsive electrical structure. An electronic flash assembly can be connected to the camera to provide additional flash illumination if necessary. The electronic flash assembly is connected with the camera in such a way that the exposure-time determining structure thereof will be operated by way of the light-responsive electrical structure irrespective of whether the selector circuit structure is set for operating the exposure-time determining structure by way of the manually adjustable electrical structure or by way of the light-responsive electrical structure.

14 Claims, 2 Drawing Figures

MANUAL OR AUTOMATIC CAMERA AND ELECTRONIC FLASH FOR USE THEREWITH

Matter enclosed in heavy brackets [ ] appears in the original patent but forms no part of this reissue specification; matter printed in italics indicates the additions made by reissue.

BACKGROUND OF THE INVENTION

The present invention relates to cameras.

In particular the present invention relates to a camera which preferably is of focal plane type and which can have connected thereto a strobe or electronic flash assembly.

When operating a photographic camera, particularly of the focal plane shutter type, with an electronic flash assembly, it is usually necessary to change over from the synchro contact to the [X contact] *X-contact* and to preset into the camera a shutter-time which is an appropriate time for electronic flash photography, such a time being referred to as the X time which is equal to a given fraction of a second. Such an X time is usually selected so as to be a relatively substantial exposure time equal to or greater than from 1/125 to 1/60 sec. As is well known, a focal plane shutter primarily provides a so-called slit exposure while the electronic flash provides a source of flash illumination the flash duration of which is extremely short so that only ½ to ¼ of the photographed scene can be illuminated by the flash illumination in the event that the scene or object is photographed with a shutter speed or exposure time which is less than 1/250 sec. It is in order to eliminate this latter drawback that the X time is generally between 1/250 and 1/60 sec., as pointed out above.

However, with camera structures of the above type the operator often fails to preset the shutter so as to provide an exposure time which is suitable for electronic flash operation. A considerable inconvenience is often the fact that such a failure to preset the exposure time not discovered during operation of the camera but rather only after the film is developed.

A further drawback conventionally encountered with electronic flash photography resides in the fact that a variation of the distance from the camera to the object which is photographed results in a corresponding variation of the light reflected from the object, so that the diaphram of the camera must be reset in accordance with such a variation. In order to avoid this drawback, there are known electronic flash units which are automatically adjustable in accordance with reflected light received thereby, such units being known as so-called autostrobes which have recently been developed and in which a photometric circuit is associated with the flash tube so that when the latter provides flash illumination the light reflected from the object which is to be photographed is measured by the photometric circuit and operation of the electronic flash unit is automatically terminated when the measured light received from the object provides the proper exposure level.

Although electronic cameras generally include a photometric circuit, such a photometric circuit which is incorporated into the electronic camera is of no use when operating with flash illumination without utilizing an electronic flash which can automatically respond to the light reflected from the object which is photographed to terminate the flash when a sufficient amount of light has been provided thereby. The photometric circuit of the camera is not operative at such a time inasmuch as the camera is set for manually providing a predetermined exposure time suitable for flash illumination as pointed out above.

In the case where the photographic camera has an automatically controlled shutter and a photometric circuit which is combined with an automatic electronic flash of the above type the [X contact] *X-contact* is closed with a predetermined time lag with respect to the starting of the running of the leading curtain of the shutter, and of course the electronic flash begins to provide flash illumination upon closing of the X-contact, the operation of the shutter being controlled by the electronic circuit which determines the sum of the natural available light and the artificial flash illumination. More specifically, upon depression of the shutter-tripping button of the camera, first the leading shutter curtain starts to run and, when the leading shutter curtain uncovers the film the X-contact is closed causing the electronic flash to provide flash illumination. When the available natural light and the flash illumination reflected from the object to be photographed obtain a proper level for exposure, the control magnet which prevents release of the trailing shutter curtain is deenergized so that the trailing curtain can now run down to terminate the exposure. In this way an exposure is completed.

In the event that the natural available light exceeds the amount of light required for proper exposure before closing of the X-contact a flash stopping signal is applied to the electronic flash unit. However, a certain inconvenience is encountered in the case where the natural available light reflected from the object to be photographed suddenly increases with the result that the electronic flash will still provide an undesirably, excessive illumination by way of the flash illumination provided thereby upon closure of the X-contact, depending upon the timing relationship between generation of the flash stopping signal and closure of the X-contact. The result is that a film frame is partially covered by the trailing shutter curtain while the rest of the frame is overexposed, since the trailing shutter curtain has already entered into and extends across the path of film exposing light.

SUMMARY OF THE INVENTION

It is accordingly a primary object of the present invention to avoid drawbacks as referred to above by providing an electronic flash of the type referred to above for a photographic camera, particularly of the focal plane shutter type, with the construction being such that even if the manually set exposure time is shorter than the X time, namely less than 1/250 sec., nevertheless the exposure time would be automatically regulated to be long enough so as to obtain a proper exposure of a film frame in the event that flash illumination is required.

Also an object of the present invention is to provide an electronic flash unit, particularly for a photographic camera of the focal plane shutter type, which is capable of utilizing the photometric circuit of the camera itself in order to achieve proper flash control, while also providing the possibility of proper exposure with an electronic flash even if the camera does not have a photometric circuit, so that the electronic flash can be of an extremely compact construction and usefulness of the photometric circuit of the camera can be improved.

A further object of the present invention is to provide particularly for an electronic camera of the focal plane shutter type an electronic flash unit which can be controlled in such a way that operation of the flash unit is prevented when the natural available light is sufficient for proper exposure prior to the moment when the electronic flash unit is to be operated, while operation of the flash unit is indeed provided in the event that the amount of light resulting from the natural available light is insufficient for proper exposure by the time the X-contact is closed.

According to the invention the camera includes an electrical exposure-time determining means as well as a light-responsive electrical means and a manually adjustable electrical means both of which are connected with the exposure-time determining means by way of a selector circuit means manually set to control the exposure-time determining means either by way of the light-responsive electrical means or by way of the manually adjustable means. An electronic flash means is provided to produce additional flash illumination if necessary for exposure. This electronic flash means is electrically connected with the above selector circuit means by way of an electrical connecting means which renders the light-responsive electrical means operable to control the exposure-time determining means irrespective of the setting of the selector circuit means.

DESCRIPTION OF DRAWINGS

The invention is illustrated by way of example of the accompanying drawings which form part of this application and in which.

DESCRIPTION OF PREFERRED EMBODIMENTS

Figure 1:
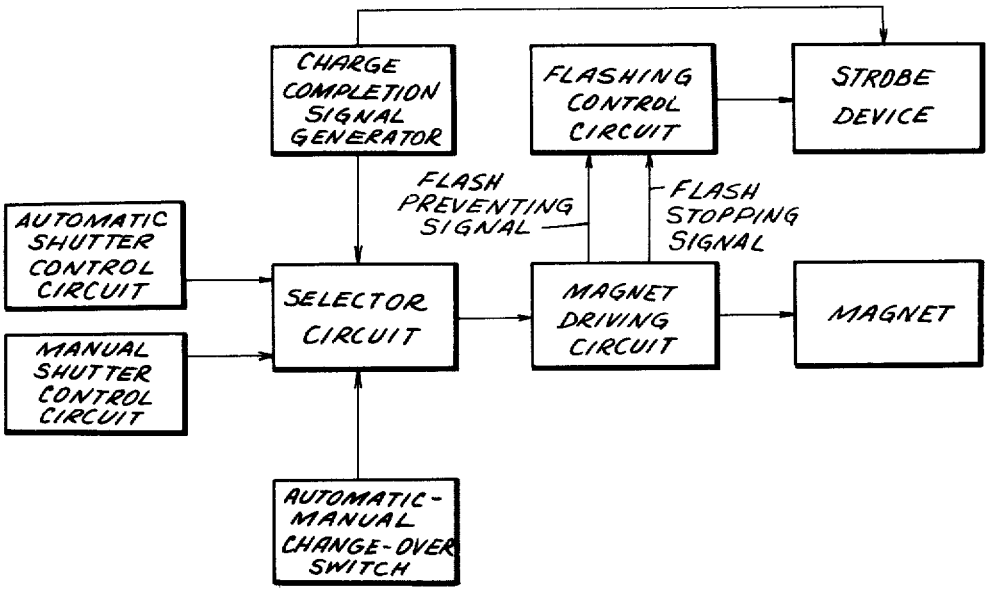
FIG. 1 is a block diagram schematically illustrating the structure of the invention, how it operates.

FIG. 1 illustrates by way of a block diagram one possible embodiment of the present invention, this embodiment including a camera section and an electronic flash or strobe section. The camera section includes the automatic shutter control circuit shown at the upper left part of FIG. 1, this automatic shutter control circuit including a light-responsive electrical means referred to in greater detail below. In addition the camera section includes the illustrated manual control circuit which takes the form of a manually adjustable electrical means. Both the automatic shutter control circuit and the manual shutter control circuit are connected through a selector circuit to a magnet driving circuit which forms an exposure-time determining means, and the selector circuit is capable of being set by way of the illustrated automatic-manual change-over switch either in the position for controlling the magnet driving circuit by way of the automatic shutter control circuit or to control the magnet driving circuit by way of the manual shutter control circuit. This selector circuit will thus control the magnet driving circuit depending upon the position of the automatic-manual change-over switch, with an X-contact of the electronic flash unit also participating in this control. The magnet driving circuit controls the magnet indicated in the block at the lower right portion of FIG. 1 in order to deenergize the latter so as to release the trailing curtain for running down so as to terminate an exposure.

The electronic flash section includes a signal generator which operates to generate a signal which is transmitted to the selector circuit to indicate that the charging circuit of the electronic flash unit has been completely charged so that the flash unit is ready for operation. The magnet driving circuit is also electrically connected with a control circuit of the flash unit for transmitting thereto either a flash preventing signal or a flash stopping signal as indicated in FIG. 1. When the charge completion signal generator provides the signal that the flash in it is ready to operate, the strobe device indicated in FIG. 1, this being the electronic flash unit, is ready for operation, and the operation thereof can be prevented or terminated by way of the flash control circuit when the latter receives from the magnet driving circuit either the flash preventing signal or the flash stopping signal as indicated in FIG. 1.

With the construction schematically illustrated in FIG. 1, in the event that the selector circuit is set by the automatic-manual change-over switch to provide for control of the magnet driving circuit by way of the automatic shutter control circuit, the exposure time will be determined in a fully automatic manner in accordance with the lighting conditions. On the other hand, if the selector circuit is set to provide for control by way of the manual shutter control circuit, then the latter circuit operates through the selector circuit to control the magnet driving circuit in such a way that an exposure time is provided in accordance with a selected exposure time, this selection being made by the operator.

Even after the strobe device or electronic flash means is attached to the camera, the shutter will be controlled in accordance with the position of the automatic-manual change-over switch as long as the charge completion signal generator has not yet generated a signal indicating that the electronic flash unit is ready for operation. Under these conditions the camera will not receive a signal indicating that the charging of the flash unit has been completed, and of course the strobe device or flash unit will not provide any flash illumination if the charge completion signal has not yet been generated even if the flash control circuit of the flash unit has the X-contact thereof closed.

Assuming that the charging of the flash unit has been completed, then the charge completion signal generator transmits a corresponding signal to the selector circuit. As will be apparent from the description below in connection with FIG. 2, the result of this operation is that the light-responsive electrical means of the automatic shutter control circuit is rendered operative to control the magnet driving circuit or exposure-time determining means irrespective of the position of the automatic-manual change-over switch.

If the lighting conditions are such that the natural available light is insufficient for a proper exposure, then the flash unit or strobe device will provide flash illumination upon closure of the [X contact] *X-contact*, and both the natural [availabee] *available* light as well as the flash illumination reflected from the object to be photographed are measured by the photometric structure of the automatic shutter control circuit and the control [manget] *magnet* of the trailing curtain of the shutter is deenergized at the instant when a proper amount of exposure has been achieved. Simultaneously with deenergizing of this magnet a flash stopping signal is generated by the magnet driving circuit and is applied to the flash control circuit of the electronic flash means so as to terminate the flash illumination by way of the electronic flash means.

In the event that a signal is applied from the automatic shutter control circuit to the magnet driving circuit indicating that a proper exposure has been achieved with the natural available light prior to closure of the X contact, which is to say prior to provision of flash illumination by the electronic flash means, then the flash preventing signal is provided from the magnet driving circuit through the flash control circuit to the electronic flash unit or strobe device so that the latter does not provide any flash illumination even after the [X contact] *X-contact* is closed.

Figure 2:
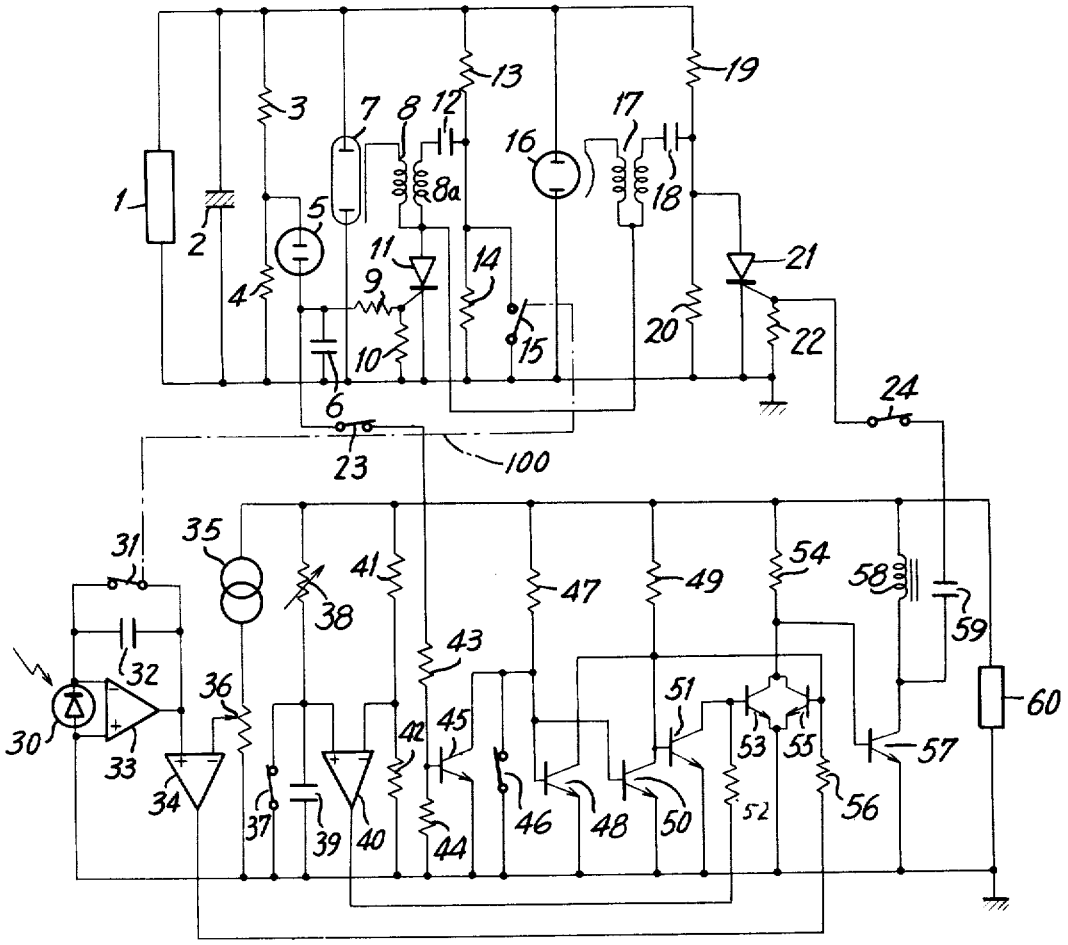
FIG. 2 is a schematic wiring diagram illustrating the various circuits of one possible embodiment of a camera and electronic flash unit according to the present invention.

Referring now to FIG. 2, there is shown therein a wiring diagram which illustrates an embodiment of the invention in greater detail. The electronic flash means is shown at the upper part of FIG. 2. This electronic flash means includes a capacitor 2, a flash tube or lamp 7, and a quenching tube 16 all connected in parallel with a source 1 of high DC voltage. Series-connected resistors 3 and 4 are also connected in parallel with respect to the voltage source 1, and a junction between the resistors 3 and 4, which serve as a divider for the source 1, is electrically connected to one terminal of a neon lamp 5 the upper terminal of which is connected with a resistor 9 and a capacitor 6 which has a terminal opposite to that connected to the neon lamp 5 grounded. Trigger coils 8 and 17 serve respectively to trigger the flash tube 7 and the quenching tube 16. A resistor 13, a trigger capacitor 12, the primary winding 8a of the trigger transformer 8 and a thyristor 11 are connected in series with each other, this series circuit also being connected in parallel with the source 1. Resistor 10 is connected between the gate and cathode of the thyristor 11, and the resistor 9 is connected between the neon tube 5 and the gate of thyristor 11. A resistor 14 and the [X contact] *X-contact* 15 are connected in parallel with each other, this parallel connection being inserted between ground and a junction between the capacitor 12 and resistor 13. A thyristor 21 forms part of a control means for the electronic flash means, this thyristor 21 serving to discharge the trigger capacitor 18 which is connected with the trigger transformer 17 of the quenching tube 16. The switches 23 and 24 form a means for connecting or disconnecting the electronic flash means to or from the camera control circuit in a manner described below.

The camera circuitry includes a light-responsive electrical means corresponding to the automatic shutter control circuit shown in FIG. 1. This light-responsive electrical means includes the photosensitive means 30 in the form of a photoelectromotive element which is electrically connected in a zero-biased state to an input of an operational amplifier 33 of the light-responsive electrical means. This latter means also includes a timing switch 31 which in a known way opens in synchronism with the start of the running down of the leading shutter curtain, and the light-responsive electrical means also includes the illustrated integration capacitor 32 connected between an inversion input terminal and an output of the amplifier 33. The timing switch 31 is adapted to be opened prior to the closing of the [ X contact] *X-contact* switch 15 shown in FIG. 2 and forming part of the electronic flash means by conventional means schematically illustrated in FIG. 2 by the dot-dash line designated 100.

The light-responsive electrical means also includes a variable resistor or potentiometer 36 which can be set by the operator in accordance with the ASA sensitivity of the flim which is exposed, this light-responsive electrical means also including a constant current source 35 which forms with the variable resistor 36 a series circuit connected in parallel with a low voltage source 60 one terminal of which is grounded. The sliding contact of the potentiometer 36 is electrically connected to the negative input terminal of a comparator 34 which also forms part of the light-responsive electrical means. This comparator 34 has its positive input terminal connected to the output of the amplifier 33.

Thus, the output of the comparator 34 forms the output of the light-responsive electrical means, and this output is electrically connected through a resistor 56 to the base of a transistor 55, on the one hand, and to the collector of a transistor 48, on the other hand, these transistors 48 and 55 forming part of the electrical exposure-time determining means.

A manually adjustable electrical means, forming the manual shutter control circuit indicated in FIG. 1, includes a variable resistor 38 which can be set in accordance with a manually selected exposure time, this resistor 38 being connected in series with a capacitor 39. The series circuit formed by elements 38 and 39, and a second series circuit formed by a pair of resistors 41 and 42 are both connected in parallel across the low voltage source 60. The manually adjustable electrical means includes a second timing switch 37 which may be operated in the same way as the first timing switch 31 and which is connected in parallel across the capacitor 39. The manually adjustable electrical means also includes a comparator 40 which has a positive input terminal connected to a junction between the variable resistor 38 and the capacitor 39, the second timing switch 37 also being connected to this junction. The negative input terminal of the comparator 40 is connected to a junction between the resistors 41 and 42. The output of the comparator 40 forms the output of the manually adjustable electrical means and is electrically connected through a resistor 52 to the base of a transistor 53, on the one hand, and to a collector of a transistor 51, on the other hand. These transistors 51 and 53 also form part of the exposure time determining means.

A selector circuit means for electrically connecting either the manually adjustable means or the light-responsive means to the exposure time determining circuit includes the selecting switch 46 which forms the automatic-manual change-over switch indicated in FIG. 1 and which is closed by the operator in order to control the exposure time determining means by way of the light-responsive means, the switch 46 being opened in order to control the exposure time determining means by way of the manually adjustable means. The electronic flash means is connected to the selector circuit means by way of an electrical connecting means which includes not only the switch 23 but also the transistor 45 which, as illustrated in FIG. 2, is connected in parallel across the selector switch 46. The base of the transistor 45 is connected in series with the switch 23 through a resistor 43, the switch 23 in turn being connected to the neon lamp 5. The base-emitter circuit of transistor 45 has the resistor 44 connected thereto. The collector of the transistor 45 of the electrical connecting means is connected through a resistor 47 to the positive terminal of the source 60. The automatic-manual change-over switch 46 is thus connected across the emitter-collector circuit of the transistor 45.

The selector circuit means also includes a transistor 48 the base of which is connected to the collector of transistor 45, on the one hand, and to the base of a transistor 50 of the selector circuit means. The collector of transistor 50 is in turn connected through a resistor 49 to the positive terminal of the source 60, this collector also being connected to the base of a transistor 51 of the selector circuit means.

The transistor 53 of the exposure time determining means has its collector connected through a resistor 54 to the positive terminal of the source 60, this collector also being connected to the collector of transistor 55 of the exposure time determining means, the collectors of the transistors 53 and 55 being electrically connected to the base of a transistor 57 of the exposure time determining [meaas] *means*.

This transistor 57 has its collector connected through a control electromagnet 58 to the positive side of the source 60. The magnet 58 when energized holds the trailing curtain against running down in a known way, and when the magnet 58 is deenergized the trailing curtain is released to run down and terminate an exposure.

The quenching tube 16 of the electronic flash means and the circuitry controlling the same, this circuitry including the trigger transformer 17 and trigger capacitor 18 as well as the thyristor 21, form a control means for preventing operation of the electronic flash means in the event that the latter has not yet operated or for terminating operation thereof in the event that flash tube 7 has been energized and has started to provide flash illumination. This control means of the electronic flash means is electrically connected to the exposure time determining means by way of a series circuit which includes the switch 24 and the capacitor 59 which is connected to a junction between the collector of transistor 57 and the electromagnet 58. This latter series circuit is connected to the gate of the thyristor 21, this gate being grounded through the resistor 22 while the thyristor 21 is connected to a junction between the series circuit formed by resistors 19 and 20, this latter circuit being connected in parallel across the source 1, with the capacitor 18 being connected also to a junction between the resistors 19 and 20.

The above-described structure of FIG. 2 operates in the following manner:

The timing switch 31 opens in synchronism with the release of the leading shutter curtain and the photoelectric current from the element 30 is integrated by way of the integration capacitor 32, the element 30 being adapted for external photometering or TTL (through-the-lens) photometering of reflected light coming from the leading curtain of the shutter and the film surface. The voltage provided by way of the slidable terminal of the potentiometer 36, set according to the film speed, namely, the voltage according to the ASA sensitivity, is compared at the comparator 34 with the voltage integrated by the capacitor 32. At the instant when the integrated voltage achieves a specified exposure level, the output of the comparator 34 varies from the negative terminal voltage L of the source 60 to the positive terminal voltage H thereof.

The voltage of capacitor 39 of the manually adjustable electrical means gradually rises in accordance with the time constants of the variable resistor 38 and the capacitor 39, upon opening of the second timing switch 37, and the output of the comparator 40 also varies from L to H at the moment of coincidence between this gradually rising voltage and the voltage at the junction point between the resistors 41 and 42.

With the transistor 45 in its OFF state and with the automatic-manual change-over switch 46 closed, both of the transistors 48 and 50 are also in their OFF state, while the transistor 51 is turned ON, so that the variation of the output of the comparator 40 from L to H can not be transmitted to the transistor 53. However, at this time the variation of the output of the comparator 34 from L to H is transmitted to the transistor 55 inasmuch as the transistor 48 is in its OFF state, while the transistor 57 is also turned OFF inasmuch as the transistor 55 is turned ON since this variation in the output of the comparator 34 is transmitted thereto. As a result, the control magnet 58 for the trailing shutter curtain is deenergized. Thus the magnet 58 has been controlled by the light-responsive electrical means while the automatic-manual change-over switch 46 remains closed, and a time which elapses from the instant of opening of the timing switch 31 to the deenergizing of the magnet 58 for the trailing shutter curtain determines the proper exposure time.

With the transistor 45 still in its OFF state but with the switch 46 placed by the operator in its open position, both of the transistors 48 and 50 are turned ON, and thus the transistor 51 is turned OFF, so that only the variation of the ouput of the comparator 40 from L to H is transmitted to the transistors 53 and 57. Thus, under these conditions the control magnet 58 for the trailing shutter curtain is controlled by the manually adjustable electrical means while the automatic-manual change-over switch 46 [remain] *remains* open, and a time which elapses from the instant when the second timing switch 37 opens to the instant of deenergizing of the magnet 58 for the trailing shutter curtain determines the manually regulated exposure time.

In order to provide independent operation of the electronic flash means, both of the switches 23 and 24 may be opened so that there is no connection between the electronic flash means and the camera. These switches 23 and 24 are both closed in order to bring about control of the electronic flash means by the photometric circuit of the camera.

When the capacitor 2 attains a specified charging voltage, the neon lamp 5 receives the voltage necessary and adequate for illuminating the same, so that the voltage of the capacitor 6 rises and the transistor 45 is turned ON. Thus in this event it will be seen that the control magnet 58 for the trailing shutter curtain is automatically controlled by way of the light-responsive electrical means when the terminal voltage of the electronic flash means reaches a specified charging voltage, irrespective of whether the camera is set by the switch 46 for automatic or manual operation. Thus the lamp 5 together with the capacitor 6 form the signal generating means for generating a signal indicating that the electronic flash means is ready for operation, and this signal is utilized also for turning the transistor 45 ON, so that irrespective of the position of the switch 46 the exposure time determining means will be controlled by the light-responsive electrical means.

Upon completion of the charging, voltage is applied through the resistors 9, 10 to the gate of the thyristor 11, so that the latter is turned ON. Upon opening of the first timing switch 31 in synchronism with the release of the leading shutter curtain, the photoelectric current from the photoelectromotive element 30 which is generated due to natural light effects integration of the integration capacitor 32. As was pointed out above, the [X contact] *X-contact* switch 15 closes subsequently to the opening of the timing switch 31. In the event that the voltage of the integrating capacitor 32 still has not achieved a specified value at the moment when the [X contact] *X-contact* or switch 15 closes, the flash tube 7 is energized since the electrical charge of the capacitor 12 is discharged through the trigger coil [8] *8a*, the thyristor 11 and the switch 15, so that a high voltage is generated [on] *at* the trigger electrode of the flash tube 7.

Thus, at this time the photoelectromotive element 30 is exposed to the light provided by the flash illumination and reflected from the object to be photographed, so that in this way the integration capacitor 32 performs an additional integration. When the integrated value achieves a specified exposure level, the control [manget] *magnet* for the trailing curtain is deenergized as described above.

Simultaneously with the deenergizing of the electromagnet 58, a flash stopping signal is generated at the collector of the transistor 57 and is applied through the capacitor 59 and switch 24 to the gate of [transistor] *thyristor* 21, causing the latter to be turned ON, and as a result the capacitor 18 is discharged so that an induction voltage is generated by the trigger coil 17, thus rendering the quenching tube 16 conductive. Now the electrical charge of the capacitor 2 is rapidly discharged and flashing of the flash tube 7 is terminated.

In the event that the voltage of the integration capacitor 32 which is generated due to the natural available light has already achieved the specified value prior to closing of the [X contact] *X-contact* or switch 15, the quenching tube 16 is triggered before triggering of the flash tube 7 and the electrical charge of the capacitor 2 is discharged so that the flash tube 7 does not become energized even when the [X contact] *X-contact* or switch 15 is subsequently closed.

If the condition of the electronic flash means is such that the capacitor 2 does not achieve the required charging voltage, then the neon lamp 5 remains nonconductive and unenergized, and thus the transistor 45 remains in its OFF state, so that under these conditions the shutter of the camera is controlled in accordance with the selected position of the switch 46 and no voltage will be applied to the gate of thyristor 11, so that the latter remains OFF. Thus, under these conditions, when the switch 15 closes or the thyristor 21 is turned ON, nevertheless the capacitors 12 and 18 cannot be discharged inasmuch as these capacitors have not been charged, with the result that the flash tube 7 and the quenching tube 16 are not triggered. Therefore, there will be no creation of flash illumination by discharge of the capacitor 2.

The structure of the present invention which is described above and shown in the drawings and which operates as set forth above provides remarkably advantageous results.

Thus, with the structure of the present invention the shutter of the camera is capable of being selectively controlled either by the light-responsive electrical means in a fully automatic manner or by way of the manually adjustable electrical means to provide a manually selected exposure time, with the latter operations under proper conditions taking place prior to complete charging of the electronic flash means, while upon completion of the charging of the electronic flash means the camera shutter is of necessity automatically controlled by way of the light-responsive electrical means irrespective of the setting of the switch 46 to provide automatic or manual shutter regulation. As a result it is completely unnecessary for the operator to preliminarily set the exposure time at a given value in order to carry out flash photography. In this way it is possible to eliminate the inconvenience encountered with conventional cameras where in order to carry out flash photography it is essential that the operator preset the exposure time to a given value.

The light-responsive electrical means is a photometric circuit of the external measuring type or of the TTL type which is incorporated within the camera, the latter utilizing reflection from the leading curtain of the shutter or from the film, and this light-responsive electrical means is used during flash photography in order to facilitate the making of exposures properly. This feature enables the electronic flash means to have an exceedingly compact construction, since the control of the electronic flash means is derived from the light-responsive electrical means of the camera itself, and thus such controls need not be incorporated into the electronic flash means while at the same time an increased usefulness is achieved for the photometric circuit which is incorporated into the camera.

Furthermore, with the structure of the invention creation of flash illumination by the electronic flash means is prevented in the event that the exposure which can be achieved from the natural available light is already at the required level prior to actuation of the electronic flash means. The latter will provide flash illumination only when the required exposure level has not been achieved by the time the [X contact] *X-contact* switch 15 closes to carry out operation with flash illumination, so that it is possible to achieve a correct exposure irrespective of the particular object which is to be photographed. Erroneous flash operation is avoided inasmuch as there will be no creation of flash illumination prior to complete charging of the electronic flash means.

In order to bring about a manually regulated operation of the electronic flash means, it is only necessary to open the switches 23 and 24 so that transmission of the charge completion signal from the electronic flash means to the camera is prevented and of course control of the electronic flash means from the camera also is prevented.

It is thus clear from the above that by way of the present invention it is indeed possible to achieve certain remarkable results.

What is claimed is:

1. In a camera, electrical exposure-time determining means, light-responsive electrical means, manually adjustable electrical means, and selector circuit means electrically connecting said light-responsive electrical means and said manually adjustable electrical means to said exposure-time determining means for selectively controlling the latter either by way of said light-responsive electrical means for automatically determining the exposure time in accordance with lighting conditions or by way of said manually adjustable electrical means for providing a manually determined exposure time, electronic flash means for providing, if necessary, additional flash illumination to be utilized for exposure, and electrical connecting means connecting said electronic flash means to said selector circuit means for rendering the latter operable to control said exposure-time determining means by way of said light-responsive electrical means irrespective of whether said selector circuit means is set for controlling said exposure-time determining means by way of said light-responsive electrical means or said manually adjustable electrical means when additional flash illumination is required from said electronic flash means.

2. The combination of claim 1 and wherein said electronic flash means includes a control means for preventing operation of said electronic flash means in the event that the latter has not yet operated to produce flash illumination and for terminating operation of said electronic flash means after the latter has started to provide flash illumination, said exposure-time determining means being electrically connected with said control means for operating the latter upon termination of an exposure either to prevent operation of said electronic flash means in the event that the latter has not yet provided any flash illumination or to terminate operation of said electronic flash means in the event that the latter has started to provide flash illumination.

3. The combination of claim 2 and wherein a means is operatively connected with said electronic flash means for selectively disconnecting said control means thereof from said exposure-time determining means and for selectively disconnecting said electronic flash means from said selector circuit means by way of said electrical connecting means, so that if desired the electronic flash means can be operated independently of the camera while said exposure-time determining means can be selectively operated either by way of said light-responsive means or by way of said manually adjustable means.

4. The combination of claim 2 and wherein said electronic flash means includes a signal-generating means for generating a signal indicating that said electronic flash means is ready for operation, said electrical connecting means connecting said signal-generating means to said selector circuit means for rendering said exposure-time determining means operable only by way of said light-responsive means irrespective of whether said selector circuit means is set for operation by said light-responsive means or by said manually adjustable means, only when said signal is generated by said signal-generating means, whereby after said signal is generated if sufficient light is available for exposure without flash illumination said exposure-time determining means will operate said control means to prevent operation of said electronic flash means while if additional flash illumination is required, said additional flash illumination will be detected by said light-responsive means and said exposure-time determining means will operate said control means to terminate operation of said electronic flash means when the light from the latter and the available light are sufficient for exposure.

5. The combination of claim 4 and wherein said selector circuit means includes a selecting switch capable of being manually placed in open or closed positions and connecting said light-responsive means to said exposure-time determining means in one of said positions and said manually adjustable means to said exposure-time determining means in the other of said positions, said electrical connecting means including a transistor connected in parallel across said switch and rendered operable upon receiving said signal for connecting said light-responsive means to said exposure-time determining means irrespective of the position of said switch.

6. The combination of claim 4 and wherein said electronic flash means includes a flash lamp and a trigger circuit electrically connected therewith for rendering said lamp operable to provide flash illumination, said trigger circuit including a trigger capacitor and a thyristor connected in series therewith and having a gate, said signal generating means being electrically connected with said gate to prevent charging of said trigger capacitor unless said signal is generated, so that without generation of said signal said electronic flash means cannot operate and said exposure-time determining means will be operated either by said light-responsive means or by said manually adjustable means in accordance with the condition of said selector circuit means.

7. The combination of claim 4 and wherein said light-responsive electrical means includes a timing switch adapted to be [closed] *opened* in synchronism with opening of a shutter of a camera for rendering said light-responsive electrical means operative, and said electronic flash means including an X-contact switch adapted to close subsequent to the [closing] *opening* of said timing switch for rendering said electronic flash means operative, whereby if said light-responsive electrical means receives an amount of light sufficient for exposure prior to closing of said X-contact switch said exposure-time determining means will terminate the exposure and will operate said control means to prevent operation of said electronic flash means even if said X-contact switch should subsequently close.

*8. Electronic flash apparatus for a camera having a shutter, electrical exposure-time determining means, light-responsive means for supplying information on light intensity to said electrical exposure-time determining means, a timing switch in said camera included in said light-responsive means and adapted to be opened in synchronism with opening of said shutter for rendering said light-responsive means operative and an X-contact switch coupled to said timing switch by means for closing said X-contact switch subsequent to the opening of said timing switch, said flash apparatus comprising:*

*flash means for illumination; and*

*control means electrically connected to said flash means and adapted to be electrically connected to said X-contact switch and to said electrical exposure-time determining means of the camera when said camera and flash apparatus are connected for preventing operation of said flash means when said flash means has not yet operated to provide flash illumination and for terminating operation of said flash means after said flash means has started to provide flash illumination.*

*9. Electronic flash apparatus as claimed in claim 8, further comprising a souce of voltage electrically connected to said flash means and signal generating means electrically connected to said source of voltage and connectable to said electrical exposure-time determining means of said camera for generating a signal indicating that said flash means is ready for operation.*

*10. Electronic flash apparatus as claimed in claim 9, wherein said camera has manually adjustable electrical means and settable selector circuit means electrically connecting said light-responsive means in said flash manually adjustable means to said exposure-time determining means, said apparatus further comprising electrical connecting means electrically connecting said signal-generating means to the selector circuit means of the camera for rendering said exposure-time determining means operable only by way of said light-responsive means irrespective of*

*the setting of said selector circuit means for operation by said light-responsive means or by said manually adjustable means, only when said signal is generated by said signal-generating means, whereby after said signal is generated if sufficient light is available for exposure without flash illumination said exposure-time determining means will operate said control means to prevent operation of said flash means while if additional flash illumination is required, said additional flash illumination will be detected by said light-responsive means and said exposure-time determining means will operate said control means to terminate operation of said flash means when the light from the latter and the available light are sufficient for exposure.*

*11. Electronic flash apparatus as claimed in claim 10, wherein said flash means consists of a flash lamp and said electronic flash apparatus further comprises a trigger circuit electrically connected to said flash lamp for rendering said lamp operable to provide flash illumination, said trigger circuit including a trigger capacitor and a thyristor connected in series therewith and having a gate, said signal-generating means being electrically connected to said gate to prevent charging of said trigger capacitor unless said signal is generated, so that without generation of said signal said electronic flash apparatus cannot operate and said exposure-time determining means of said camera will be operated either by said light-responsive means or by said manually adjustable means in accordance with the condition of said selector circuit means.*

*12. Electronic flash apparatus as claimed in claim 10, wherein if said light-responsive means receives an amount of light sufficient for exposure prior to closing of said X-contact switch, said exposure-time determining means of said camera will terminate the exposure and will operate said control means to prevent operation of said electronic flash apparatus even if said X-contact switch should subsequently close.*

*13. Electronic flash apparatus as claimed in claim 8, further comprising switch means electrically connected to said flash means for selectively disconnecting said control means from said exposure-time determining means of said camera, to permit said flash means to be operated independently of said camera.*

*14. Electronic flash apparatus for a camera having a shutter, electrical exposure-time determining means, light-responsive means for supplying information on light intensity to said electrical exposure-time determining means, a timing switch in said camera included in said light-responsive means adapted to be opened in synchronism with opening of said shutter for rendering said light-responsive means operative and an X-contact switch coupled to said timing switch by means for closing said X-contact switch subsequent to the opening of said timing switch, said flash apparatus comprising:*

*a source of potential;*

*a main capacitor electrically connected to said source of potential;*

*flash means for providing flash illumination; and*

*flash control means adapted to be electrically connected to said X-contact switch and to said electrical exposure-time determining means of said camera when said camera and flash apparatus are connected, said control means including,*

*a first trigger circuit including a first trigger transformer for triggering said flash means and a first thyristor electrically connecting said first transformer to said source of potential and which becomes conductive in response to a signal representing completion of charging of said main capacitor;*

*quenching means electrically connected in parallel with said flash means for terminating energization thereof; and*

*a second trigger circuit including a second trigger transformer for triggering said quenching means and a second thyristor electrically coupled to said second transformer and electrically connected to said source of potential, said second thyristor becoming conductive in response to exposure-time information from said electrical exposure-time determining means of the camera, said second trigger transformer being electrically connected to said source of potential through said first thyristor, said second trigger circuit being caused to operate before said first trigger circuit to prevent said flash means from flashing when the exposure-time information from said electrical exposure-time determining means indicates that flash illumination from said flash means is not required and when said exposure-time information indicates a requirement for flash illumination and exposure-time information turning on said second thyristor upon reaching a proper exposure value after said flash means has started providing flash illumination thereby automatically adjusting the duration of said flash illumination.*

* * * * *